US011683398B2

United States Patent
Zheng et al.

(10) Patent No.: US 11,683,398 B2
(45) Date of Patent: Jun. 20, 2023

(54) METHOD, APPARATUS FOR CROSS-PROTOCOL OPPORTUNISTIC ROUTING, ELECTRONIC DEVICE AND STORAGE MEDIUM

(71) Applicant: Beijing University of Posts and Telecommunications, Beijing (CN)

(72) Inventors: Xiaolong Zheng, Beijing (CN); Dan Xia, Beijing (CN); Liang Liu, Beijing (CN); Huadong Ma, Beijing (CN)

(73) Assignee: BEIJING UNIVERSITY OF POSTS AND TELECOMMUNICATIONS, Beijing (CN)

(*) Notice: Subject to any disclaimer, the term of this patent is extended or adjusted under 35 U.S.C. 154(b) by 72 days.

(21) Appl. No.: 17/505,175

(22) Filed: Oct. 19, 2021

(65) Prior Publication Data

US 2022/0124179 A1   Apr. 21, 2022

(30) Foreign Application Priority Data

Oct. 21, 2020 (CN) .......................... 202011132237.7

(51) Int. Cl.
*H04L 69/14* (2022.01)
*H04L 69/22* (2022.01)
(Continued)

(52) U.S. Cl.
CPC .............. *H04L 69/14* (2013.01); *H04L 69/22* (2013.01); *H04W 28/0221* (2013.01);
(Continued)

(58) Field of Classification Search
CPC ......... H04L 69/00; H04L 69/14; H04L 69/22; H04L 1/0044; H04L 41/00; H04L 41/145;
(Continued)

(56) References Cited

U.S. PATENT DOCUMENTS

2009/0097452 A1* 4/2009 Gogic .................... H04B 7/269
370/336
2012/0218966 A1* 8/2012 Yamazaki ............. H04W 16/18
370/328
(Continued)

FOREIGN PATENT DOCUMENTS

CN         106911433 A      6/2017
CN         107018548 A      8/2017
(Continued)

OTHER PUBLICATIONS

Y. He and X. Zheng, "Research on Wireless Network Co-Existence at 2.4 GHz", Journal of Computer Research and Development, 2016, pp. 26-37.
(Continued)

*Primary Examiner* — Warner Wong
(74) *Attorney, Agent, or Firm* — Burr & Forman LLP

(57) ABSTRACT

The embodiments of the present invention provide a method, apparatus for cross-protocol opportunistic routing, an electronic device, and a storage medium, the method includes: when there is a first data packet in a low-power wireless network, simulating the first data packet to generate a second data packet including to-be-transmitted data in the first data packet; obtaining identification information of a destination node in the first data packet, and selecting a low-power node with the lowest delay to the destination node in the low-power wireless network, except the first low-power node, as a forwarding low-power node based on the identification information of the destination node; sending the generated second data packet to the forwarding low-power node, so that the forwarding low-power node forwards the to-be-transmitted data to the destination node. By using high-power nodes, when there is a data packet in the low-power node, the data packet can be sent in time without being transmitted in a reserved idle channel, thereby
(Continued)

reducing the transmission delay of the data packet from the source node to the destination node in the low-power wireless network.

14 Claims, 5 Drawing Sheets

(51) Int. Cl.
  *H04W 28/02* (2009.01)
  *H04W 40/12* (2009.01)
  *H04L 43/50* (2022.01)
  *H04W 24/06* (2009.01)

(52) U.S. Cl.
  CPC .......... *H04L 43/50* (2013.01); *H04W 24/06* (2013.01); *H04W 40/12* (2013.01)

(58) Field of Classification Search
  CPC ......... H04L 43/00; H04L 43/50; H04L 69/02; H04L 69/03; H04W 28/00; H04W 28/02; H04W 28/0215; H04W 28/0221; H04W 40/02; H04W 40/08; H04W 16/22; H04W 24/00; H04W 24/06; H04W 2012/5678
  See application file for complete search history.

(56) References Cited

U.S. PATENT DOCUMENTS

| 2015/0109943 | A1* | 4/2015 | Sahin | H04W 24/02 370/252 |
| 2016/0242180 | A1* | 8/2016 | Richards | H04W 76/15 |
| 2021/0306930 | A1* | 9/2021 | Wolf | H04W 40/22 |

FOREIGN PATENT DOCUMENTS

| CN | 108135020 A | 6/2018 |
| WO | 2019124614 A1 | 6/2019 |

OTHER PUBLICATIONS

Y. Wang, X. Zheng, L. Liu, and H. Ma, "CoHop: Quantitative Correlation based Channel Hopping for Low-power Wireless Networks", 2020 17th Annual IEEE International Conference on Sensing, Communication, and Networking (SECON), 2020, pp. 1-9.

First Office Action from Chinese Application No. 202011132237.7 dated Feb. 14, 2022, all pages cited in its entirety.

* cited by examiner

METHOD, APPARATUS FOR CROSS-PROTOCOL OPPORTUNISTIC ROUTING, ELECTRONIC DEVICE AND STORAGE MEDIUM

CROSS-REFERENCE TO RELATED APPLICATION

The present application claims the priority to a Chinese Patent Application No. 202011132237.7, filed with the China National Intellectual Property Administration on Oct. 21, 2020 and entitled "METHOD, APPARATUS FOR CROSS-PROTOCOL OPPORTUNISTIC ROUTING, ELECTRONIC DEVICE AND STORAGE MEDIUM", which is incorporated herein by reference in its entirety.

TECHNICAL FIELD

The present invention relates to the field of wireless communication technology, and in particular, to a method, apparatus for cross-protocol opportunistic routing, an electronic device, and a storage medium.

BACKGROUND

With the rapid development of communication technology, wireless networks have become ubiquitous. Currently, commonly used wireless networks generally include high-power wireless networks and low-power wireless networks. In the process of continuously expanding respective application spaces of different types of wireless networks, a situation that multiple networks and multiple protocols coexist in the same space is gradually formed.

For a low-power wireless network, due to the use of duty cycle mode for operation, there will be a large delay in the data forwarding process. Therefore, in the prior art, an opportunistic routing manner is used to implement the forwarding of data packets, so as to shorten the delay. Specifically, when a data packet is sent from a source node to a destination node in a low-power wireless network, the data sending node sends the data packet to be sent to a plurality of receiving nodes that are in an awake state, and the plurality of receiving nodes then determine their priorities according to their metrics to the destination node, and select a node with the highest priority as the data sending node to send the data packet to a plurality of receiving nodes that are in an awake state of a next hop, and the process is repeated until the data packet is sent to the destination node.

However, when a high-power wireless network and a low-power wireless network coexist, the high-power wireless network may cause cross-protocol interference to the low-power wireless network, which may seriously affect the forwarding of the data packet in the low-power wireless network. In order to reduce the influence of cross-protocol interference on the low-power wireless network, in the prior art, a long idle channel is reserved for the low-power wireless network by coordinating a channel of the high-power wireless network and a channel of the low-power wireless network, so that the low-power wireless network can have a long idle channel for data packet transmission.

However, in this way of coordinating the channel of the high-power wireless network and the channel of the low-power wireless network, since the low-power wireless network is required to transmit the data packet in the reserved idle channel, the data packet of the source node in the low-power wireless network cannot be transmitted to the destination node in the low-power wireless network in time, and therefore, the delay in transmitting the data packet may be increased.

SUMMARY

The purpose of the embodiments of the present invention is to provide a method, an apparatus for cross-protocol opportunistic routing, an electronic device, and a storage medium, so as to reduce transmission delay of a data packet from a source node to a destination node in a low-power wireless network. The specific technical solution is as follows.

In a first aspect, an embodiment of the present invention provides a method for cross-protocol opportunistic routing, which is applied to a first high-power node in a high-power wireless network, the first high-power node is any high-power wireless communication device in the high-power wireless network, and an opportunistic routing protocol is configured on the first high-power node, the method includes:

monitoring whether there is a first data packet in a low-power wireless network, wherein the first data packet is sent by a first low-power node in the low-power wireless network based on the opportunistic routing protocol, and the first low-power node is a low-power wireless communication device located in a communication range of the first high-power node;

if there is a first data packet in the low-power wireless network, simulating the first data package to generate a second data package comprising at least to-be-transmitted data in the first data package;

obtaining identification information of a destination node in the first data packet, and selecting a low-power node with a lowest delay to the destination node in the low-power wireless network, except the first low-power node, as a forwarding low-power node based on the identification information of the destination node; and sending the generated second data packet to the forwarding low-power node, so that the forwarding low-power node obtains the to-be-transmitted data from the second data packet and forwards the data to the destination node.

In a second aspect, an embodiment of the present invention further provides an apparatus for cross-protocol opportunistic routing, which is applied to at least one high-power node in a high-power wireless network, wherein each high-power node is a high-power wireless communication device, and an opportunistic routing protocol is configured on the high-power node, and the apparatus includes:

a monitoring module, configured for monitoring whether there is a first data packet in a low-power wireless network, and if there is a first data packet in the low-power wireless network, triggering a simulation module, wherein the first data packet is sent by a first low-power node in the low-power wireless network based on the opportunistic routing protocol, and the first low-power node is a low-power wireless communication device located in a communication range of the first high-power node;

a simulation module, configured for simulating the first data packet to generate a second data packet comprising at least to-be-transmitted data in the first data packet;

a forwarding low-power node selection module, configured for obtaining identification information of a destination node in the first data packet, and selecting a low-power node with a lowest delay to the destination node in the low-power wireless network, except the first low-power node, as a forwarding low-power node based on the identification information of the destination node; and a sending module, configured for sending the generated second data packet to the forwarding low-power node, so that the forwarding low-power node obtains the to-be-transmitted data from the second data packet and forwards the data to the destination node.

In a third aspect, an embodiment of the present invention further provides an electronic device, comprising a processor, a communication interface, a memory, and a communication bus, wherein the processor, the communication interface, and the memory communicate with each other through the communication bus;

the memory is configured for storing computer programs; and the processor is configured for implementing the steps of any one of the methods for cross-protocol opportunistic routing when executing the programs stored in the memory.

In a fourth aspect, an embodiment of the present invention further provides a computer-readable storage medium, stored thereon computer programs that, upon executed by a processor, implement the steps of any one of the methods for cross-protocol opportunistic routing.

In a fifth aspect, an embodiment of the present invention provides a computer program product containing instructions that, upon running on a computer, cause the computer to perform the steps of any one of the methods for cross-protocol opportunistic routing.

The embodiments of the invention have the following beneficial effects:

the method, apparatus for cross-protocol opportunistic routing, electronic device and storage medium according to the embodiments of the invention may be applied to a first high-power node in a high-power wireless network. The first high-power node is any high-power wireless communication device in the high-power wireless network, and an opportunistic routing protocol is configured on the first high-power node. The first high-power node may firstly monitor whether there is a first data packet in a low-power wireless network, the first data packet is sent by a first low-power node in the low-power wireless network based on the opportunistic routing protocol and the first low-power node is a low-power wireless communication device located in a communication range of the first high-power node. If there is the first data packet in the low-power wireless network, the first high-power node simulates the first data packet to generate a second data packet including at least the to-be-transmitted data in the first data packet; obtains identification information of a destination node in the first data packet, and selects a low-power node with the lowest delay to the destination node in the low-power wireless network, except the first low-power node, as a forwarding low-power node based on the identification information of the destination node; and sends the generated second data packet to the forwarding low-power node, so that the forwarding low-power node obtains the to-be-transmitted data from the second data packet and forwards the data to the destination node. Since the high-power node is used in the embodiment of the invention, when there is a data packet in the low-power node, the data packet can be sent in time without transmitting the data packet on a reserved channel, and the high-power node receives the data packet based on the opportunistic routing protocol and forwards the data packet to the forwarding low-power node, and then the forwarding low-power node sends the data packet to the destination node, thereby reducing the transmission delay of the data packet from the source node to the destination node in the low-power wireless network. Further, since high-power nodes generally have a larger communication range than low-power nodes, compared to transmitting the data packet through the low-power wireless network, transmitting the data packet through a high-power node can reduce the hops of nodes passed by the data packet from the source node to the destination node, and therefore, the transmission delay can be further reduced.

BRIEF DESCRIPTION OF THE DRAWINGS

In order to more clearly illustrate the embodiments of the present invention or the technical solutions in the prior art, the drawings that need to be used in the embodiments or the prior art descriptions will be briefly described below, it is obvious that the drawings in the following description are only some embodiments of the present invention, and it is obvious for those skilled in the art that other embodiments can be obtained according to the drawings without creative efforts.

DETAILED DESCRIPTION

The technical solutions in the embodiments of the present invention will be clearly and completely described below with reference to the drawings in the embodiments of the present invention, and it is obvious that the described embodiments are only a part of the embodiments of the present invention, and not all of the embodiments. All other embodiments, which can be obtained by a person skilled in the art without making any creative effort based on the embodiments in the present invention, belong to the protection scope of the present invention.

In order to solve the problems in the prior art, the embodiments of the present invention provide a method, apparatus, for cross-protocol opportunistic routing, an electronic device and a storage medium, so as to reduce transmission delay of a data packet from a source node to a destination node in a low-power wireless network.

Figure 1:
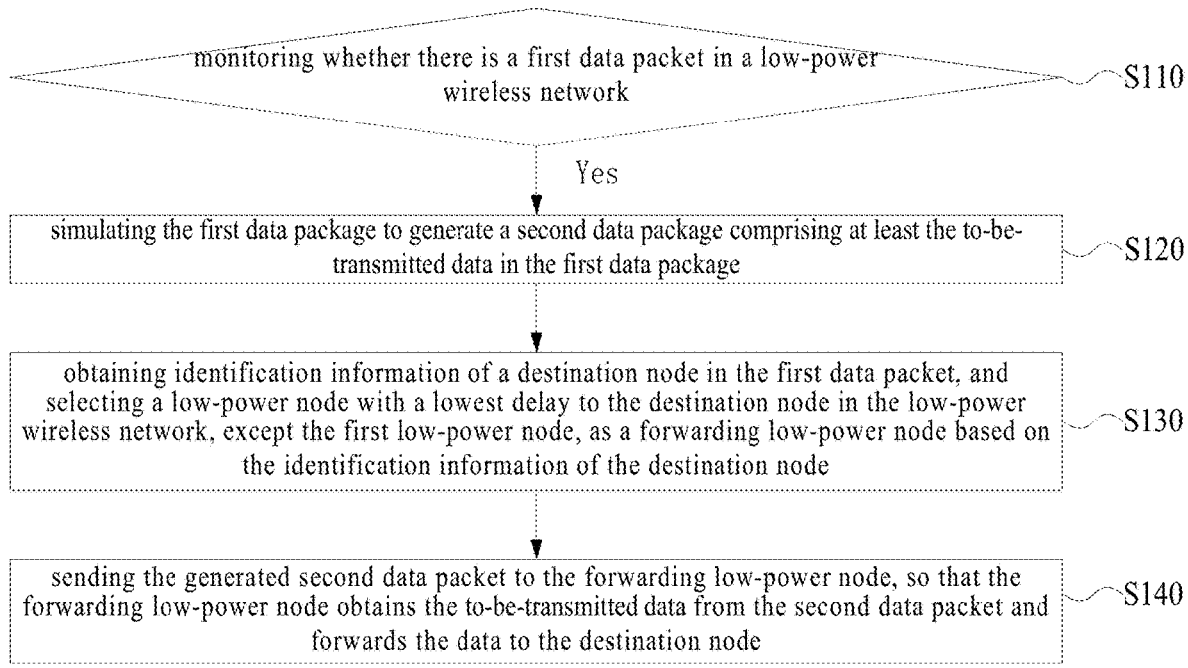
FIG. 1 is a flowchart of a first implementation of a method for cross-protocol opportunistic routing according to an embodiment of the present invention.

In the following, a method for cross-protocol opportunistic routing according to an embodiment of the present invention is first introduced, as shown in FIG. 1, which is a flowchart of a first implementation of a method for cross-protocol opportunistic routing according to the embodiment of the present invention. The method may be applied to a first high-power node in a high-power wireless network, the first high-power node is any high-power wireless communication device in the high-power wireless network, and the first high-power node is configured with an opportunistic routing protocol, and the method may include:

S110: monitoring whether there is a first data packet in a low-power wireless network, and if there is the first data packet in the low-power wireless network, perform step S120.

The first data packet is sent by a first low-power node in the low-power wireless network based on the opportunistic routing protocol, and the first low-power node is a low-power wireless communication device located in a communication range of the first high-power node. The power of each low-power node in the low-power wireless network is smaller than or equal to 0 dBm, and the power of each high-power node in the high-power wireless network is greater than 10 dBm.

In some examples, since the first high-power node is configured with an opportunistic routing protocol, when any low-power node transmits a packet based on the opportunistic routing protocol, the first high-power node may monitor whether there is a data packet sent by the low-power node, and if there is the data packet sent by the low-power node, it indicates that there is a first packet in the low-power wireless network.

In yet other examples, since the communication range of the first high-power node is limited, when the first high-power node monitors that the first data packet exists in the low-power wireless network, it indicates that the first data packet is sent by a low-power wireless communication device within the communication range of the first high-power node.

In some examples, the high-power node in the embodiment of the present invention may be a high-power wireless communication device such as a WiFi device, and the low-power node may be a low-power wireless communication device such as ZigBee and Bluetooth device.

S120: simulating the first data packet to generate a second data packet including at least to-be-transmitted data in the first data packet.

When monitoring that there is a first data packet, the first high-power node may obtain the first data packet. However, since the first data packet is sent by a low-power node, and the low-power node and the high-power node are usually different types of nodes, the high-power node cannot directly forward the first data packet. Based on this, the first high-power node may simulate the first data packet, so as to generate a second data packet including at least the to-be-transmitted data in the first data packet. The second data packet is a data packet that corresponds to the type of the first high-power node, which can be sent by the first high-power node, and may also be received by a low-power wireless node.

In some examples, when the first data packet is simulated, a preset data packet template may be obtained first, and then at least the to-be-transmitted data is added to the preset data packet template, so that a second data packet including at least the to-be-transmitted data in the first data packet may be obtained. The preset data packet template is set based on historical data packets of the same type as the first data packet.

In yet other examples, the first data packet may be simulated using WEBee technology, so as to generate a second data packet including at least the to-be-transmitted data in the first data packet.

S130: obtaining identification information of a destination node in the first data packet, and selecting a low-power node with a lowest delay to the destination node in the low-power wireless network, except the first low-power node, as a forwarding low-power node based on the identification information of the destination node.

After the second data packet is generated, in order to transmit the to-be-transmitted data that carried in the second data packet to the destination node, a next hop node of the first high-power node, that is, a node receiving the second data packet, needs to be selected.

In some examples, when the first low-power node sends the first data packet, identification information of a destination node is carried in the first data packet, such that the intermediate node, when forwarding, can forward the first data packet based on the identification information of the destination node. Therefore, when selecting the next hop node of the first high-power node, the first high-power node may first obtain the identification information of the destination node of the first packet, and then select a low-power node with the lowest delay to the destination node in the low-power wireless network, except the first low-power node, as the forwarding low-power node based on the identification information of the destination node.

By selecting the low-power node with the lowest delay to the destination node in the low-power wireless network, except the first low-power node, as the forwarding low-power node, the transmission time of the first data packet in the low-power wireless network can be reduced as much as possible, thereby reducing the transmission delay of the first data packet in the low-power wireless network.

S140: sending the generated second data packet to the forwarding low-power node, so that the forwarding low-power node obtains the to-be-transmitted data from the second data packet and forwards the data to the destination node.

After selecting the forwarding low-power node, the first high-power node may send the generated second data packet to the forwarding low-power node, and the forwarding low-power node may receive the second data packet, and then obtain the to-be-transmitted data from the second data packet, and then forward the data to the destination node.

In some examples, when generating the second packet, the first high-power node may construct a payload that can be identified as a legitimate data packet by the low-power node, the payload has a radio frequency waveform similar to a radio frequency waveform of a signal transmitted by the low-power node. Therefore, the second packet can be received by the forwarding low-power node after transmitted by the first high-power node.

In a possible implementation of the embodiment of the present invention, the destination node may be located in a communication range of the first high-power node, or may not be located in the communication range of the first high-power node. Based on this, after obtaining the identification information of the destination node in the first data packet, the first high-power node may first determine whether the destination node is within the communication range of the first high-power node.

When the destination node is within the communication range of the first high-power node, the first high-power node may directly send the second packet to the destination node.

In this way, the transmission delay of the first data packet in the low-power wireless network may be further reduced.

When the destination node is not within the communication range of the first high-power node, a low-power node with the lowest delay to the destination node in the low-power wireless network, except the first low-power node, may be selected as a forwarding low-power node based on the identification information of the destination node.

The method for cross-protocol opportunistic routing according to the embodiment of the invention may be applied to a first high-power node in a high-power wireless network. The first high-power node is any high-power wireless communication device in the high-power wireless network, and the first high-power node having an opportunistic routing protocol configured thereon. The first high-power node may firstly monitor whether there is a first data packet in a low-power wireless network, the first data packet is sent by a first low-power node in the low-power wireless network based on the opportunistic routing protocol and the first low-power node is a low-power wireless communication device located in a communication range of the first high-power node. If there is a first data packet in the low-power wireless network, the first high-power node simulates the first data packet to generate a second data packet including at least the to-be-transmitted data in the first data packet; obtains identification information of a destination node in the first data packet, and selects a low-power node with the lowest delay to the destination node in the low-power wireless network, except the first low-power node, as a forwarding low-power node based on the identification information of the destination node; and sends the generated second data packet to the forwarding low-power node, so that the forwarding low-power node obtains the to-be-transmitted data from the second data packet and forwards the data to the destination node. Since the high-power node is used in the embodiment of the invention, when there is a data packet in the low-power node, the data packet can be sent in time without transmitting the data packet on a reserved channel, and the high-power node receives the data packet based on the opportunistic routing protocol and forwards the data packet to the forwarding low-power node, and then the forwarding low-power node sends the data packet to the destination node, thereby reducing the transmission delay of the data packet from the source node to the destination node in the low-power wireless network. Further, since high-power nodes generally have a larger communication range than low-power nodes, compared to transmitting the data packet through the low-power wireless network, transmitting the data packet through a high-power node can reduce the hops of nodes passed by the data packet from the source node to the destination node, and therefore, the transmission delay can be further reduced.

Figure 2:
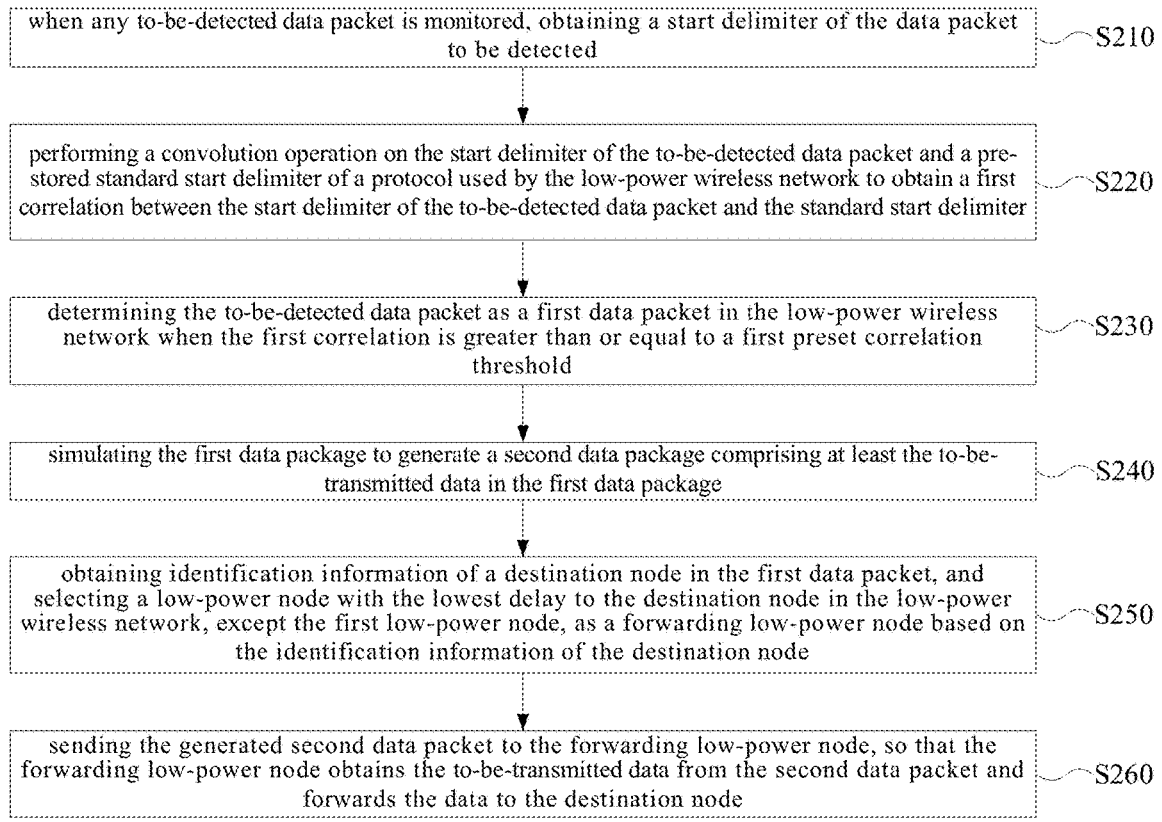
FIG. 2 is a flowchart of a second implementation of a method for cross-protocol opportunistic routing according to an embodiment of the present invention.

On the basis of the method for cross-protocol opportunistic routing shown in FIG. 1, an embodiment of the present invention further provides a possible implementation, as shown in FIG. 2, which is a flowchart of a second implementation of a method for cross-protocol opportunistic routing according to the embodiment of the present invention, and the method may include:

S210: when any to-be-detected data packet is monitored, obtaining a start delimiter of the to-be-detected data packet;

S220: performing a convolution operation on the start delimiter of the to-be-detected data packet and a pre-stored standard start delimiter of a protocol used by the low-power wireless network to obtain a first correlation between the start delimiter of the to-be-detected data packet and the standard start delimiter;

S230: determining the to-be-detected data packet as a first data packet in the low-power wireless network when the first correlation is greater than or equal to a first preset correlation threshold;

S240: simulating the first data packet to generate a second data packet including at least to-be-transmitted data in the first data packet;

S250: obtaining identification information of a destination node in the first data packet, and selecting a low-power node with the lowest delay to the destination node in the low-power wireless network, except the first low-power node, as a forwarding low-power node based on the identification information of the destination node; and S260: sending the generated second data packet to the forwarding low-power node, so that the forwarding low-power node obtains the to-be-transmitted data from the second data packet and forwards the data to the destination node.

In some examples, when monitoring whether there is a first data packet in a low-power wireless network, the first high-power node may first monitor whether a data packet exists, and if the data packet exists, take the monitored data packet as a to-be-detected data packet, and then determine whether there is a start delimiter in the to-be-detected data packet.

For a data packet transmitted by a low-power node, a start delimiter is usually carried, for example, in a data packet sent by a ZigBee node, a start delimiter is usually carried.

When detecting that there is a start delimiter in the to-be-detected data packet, the first high-power node may obtain the start delimiter of the to-be-detected data packet.

In order to further confirm whether the to-be-detected data packet is sent by the low-power node, the first high-power node may perform a convolution operation on the start delimiter of the to-be-detected data packet and a pre-stored standard start delimiter of a protocol used by the low-power wireless network, so as to obtain a first correlation between the start delimiter of the to-be-detected data packet and the standard start delimiter; and then, the first correlation is compared with a first preset correlation threshold, and the to-be-detected data packet is determined as a first data packet in the low-power wireless network when the first correlation is greater than or equal to the first preset correlation threshold.

In some examples, the first high-power node may use the following formula for the start delimiter $r_i$ of the to-be-detected data packet and a pre-stored standard start delimiter $x_k$ of a protocol used by the low-power wireless network.

In some examples, the first high-power node may perform a convolution operation on the start delimiter of the to-be-detected data packet and a pre-stored standard start delimiter of a protocol used by the low-power wireless network, to obtain a first correlation $corr_i$ between the start delimiter of the to-be-detected data packet and the standard start delimiter by using the following formula:

$$corr_i = \sum_{k=0}^{127} r_{i+k} \cdot x_k^*, \ i = 1, 2, \ldots, n-127$$

$r_{i+k}$ is a start delimiter of the (i+k)-th sampling point corresponding to the received signal, $x_k^*$ is the conjugate of the pre-stored standard start delimiter $x_k$ of the protocol used by the low-power wireless network, and n is the total number of sampling points of the to-be-detected data packet.

It can be quickly determined whether the to-be-detected data packet is a data packet sent by a low-power node by detecting the start delimiter of the to-be-detected data packet and calculating the first correlation between the start delimiter of the to-be-detected data packet and the standard start delimiter, so that it can be quickly determined whether the to-be-detected data packet is a first data packet in the low-power wireless network.

It can be understood that steps S240 to S260 in the embodiment of the present invention are the same as or similar to steps S120 to S140 in the first implementation in an embodiment of the present invention, and will not be repeated here.

Figure 3:
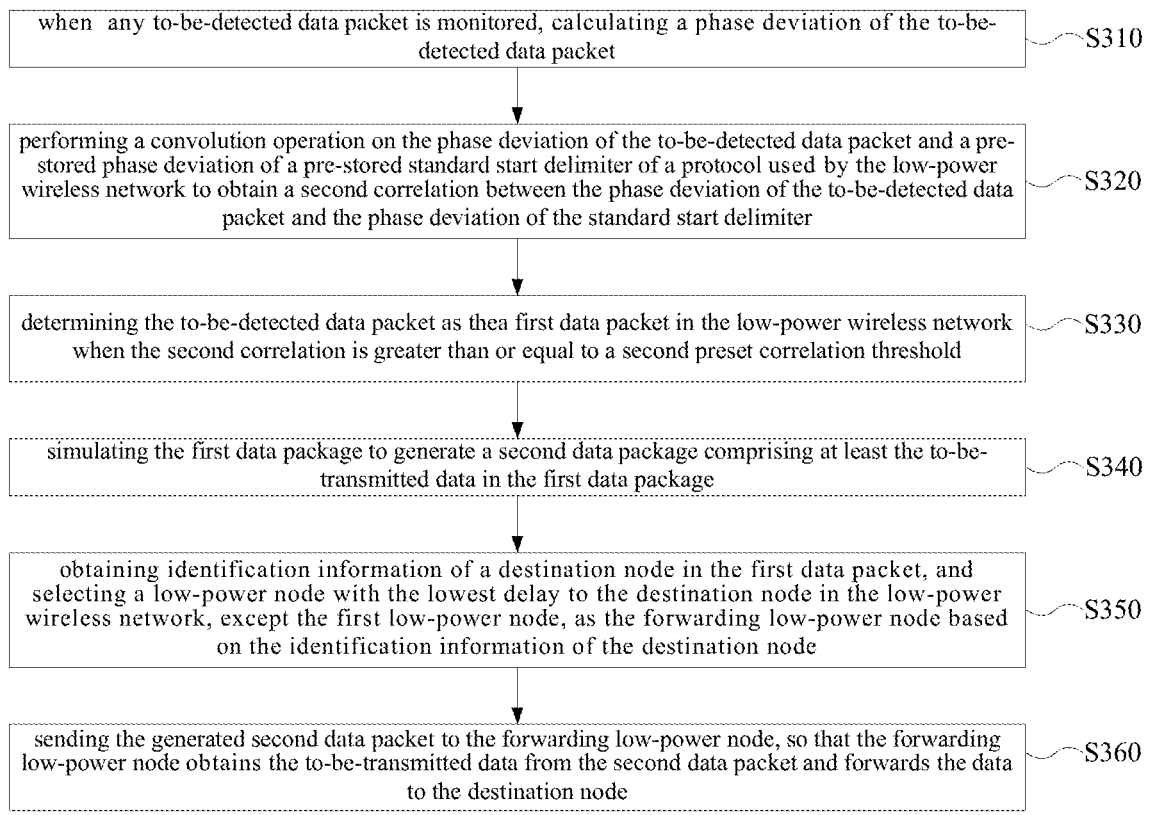
FIG. 3 is a flowchart of a third implementation of a method for cross-protocol opportunistic routing according to an embodiment of the present invention.

On the basis of the method for cross-protocol opportunistic routing shown in FIG. 1, an embodiment of the present invention further provide a possible implementation, as shown in FIG. 3, which is a flowchart of a third implementation of a method for cross-protocol opportunistic routing according to the embodiment of the present invention, and the method may include:

S310: when any to-be-detected data packet is monitored, calculating a phase deviation of the to-be-detected data packet;

S320: performing a convolution operation on the phase deviation of the to-be-detected data packet and a phase deviation of a pre-stored standard start delimiter of a protocol used by the low-power wireless network to obtain a second correlation between the phase deviation of the to-be-detected data packet and the phase deviation of the standard start delimiter;

S330: determining the to-be-detected data packet as a first data packet in the low-power wireless network when the second correlation is greater than or equal to a second preset correlation threshold;

S340: simulating the first data packet to generate a second data packet including at least to-be-transmitted data in the first data packet;

S350: obtaining identification information of a destination node in the first data packet, and selecting a low-power node with the lowest delay to the destination node in the low-power wireless network, except the first low-power node, as a forwarding low-power node based on the identification information of the destination node; and S360: sending the generated second data packet to the forwarding low-power node, so that the forwarding low-power node obtains the to-be-transmitted data from the second data packet and forwards the data to the destination node.

In some examples, the embodiments of the present invention also provide another way to monitor whether there is a first data packet in a low-power wireless network. Specifically, the first high-power node may first monitor whether a data packet exists, and if the data packet exists, take the monitored data packet as a to-be-detected data packet, and then calculate a phase deviation of the to-be-detected data packet.

After obtaining the phase deviation of the to-be-detected data packet by calculation, the first high-power node may perform a convolution operation on the phase deviation of the to-be-detected data packet and a phase deviation of a pre-stored standard start delimiter of a protocol used by the low-power wireless network to obtain a second correlation between the phase deviation of the to-be-detected data packet and the phase deviation of the standard start delimiter.

In some examples, the first high-power node may perform cross-correlation between the phase deviation of the to-be-detected data packet and the phase deviation of the pre-stored standard start delimiter of the protocol used by the low-power wireless network, so as to obtain the second correlation between the phase deviation of the to-be-detected data packet and the phase deviation of the standard start delimiter.

Then, the first high-power node may compare the second correlation with a second preset correlation threshold, and determine the to-be-detected data packet as the first data packet in the low-power wireless network when the second correlation is greater than or equal to the second preset correlation threshold.

It can be quickly determined whether the to-be-detected data packet is a data packet sent by the low-power node by calculating the phase deviation of the to-be-detected data packet and calculating the second correlation between the phase deviation of the data to be detected and the phase deviation of the standard start delimiter, so that it can be quickly determined whether the to-be-detected data packet is a first data packet in the low-power wireless network.

It can be understood that steps S340 to S360 in the embodiment of the present invention are the same as or similar to steps S120 to S140 in the first implementation in an embodiment of the present invention, and will not be repeated here.

Figure 4:
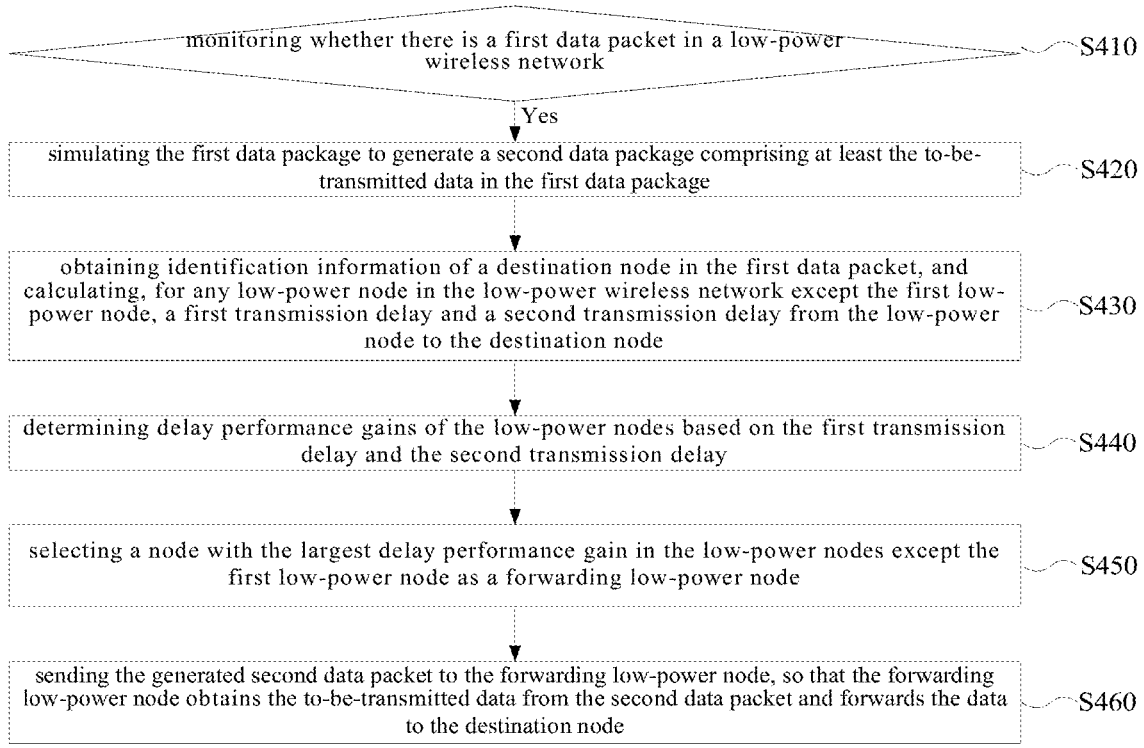
FIG. 4 is a flowchart of a fourth implementation of a method for cross-protocol opportunistic routing according to an embodiment of the present invention.

On the basis of the method for cross-protocol opportunistic routing shown in FIG. 1, an embodiment of the present invention further provide a possible implementation, as shown in FIG. 4, which is a flowchart of a fourth implementation of a method for cross-protocol opportunistic routing according to the embodiment of the present invention, and the method may include:

S410: monitoring whether there is a first data packet in a low-power wireless network, if there is the first data packet in the low-power wireless network, perform step S420, wherein, the first data packet is sent by a first low-power node in the low-power wireless network based on an opportunistic routing protocol, and the first low-power node is a low-power wireless communication device located in a communication range of the first high-power node;

S420: simulating the first data packet to generate a second data packet including at least to-be-transmitted data in the first data packet;

S430: obtaining identification information of a destination node in the first data packet, and calculating, for any low-power node in the low-power wireless network except the first low-power node, a first transmission delay and a second transmission delay from the low-power node to the destination node, the first transmission delay is a delay when nodes from the low-power node to the destination node are all low-power nodes, and the second delay is a delay when there is at least one other high-power node except the first high-power node between the low-power node and the destination node;

S440: determining delay performance gains of the low-power nodes based on the first transmission delay and the second transmission delay;

S450: selecting a node with the largest delay performance gain in the low-power nodes except the first low-power node as a forwarding low-power node; and S460: sending the generated second data packet to the forwarding low-power node, so that the forwarding low-power node obtains the to-be-transmitted data from the second data packet and forwards the data to the destination node.

In some examples, when the first high-power node selects a forwarding low-power node from the low-power wireless network, an embodiment of the present invention further provides a possible implementation.

Specifically, the first high-power node may first obtain identification information of the destination node in the first data packet, and then calculate, for any low-power node in the low-power wireless network except the first low-power node, a first transmission delay from the low-power node to the destination node when nodes from the low-power node to the destination node are all low-power nodes, and calculate a second transmission delay from the low-power node to the destination node when there is at least one other high-power node except the first high-power node between the low-power node and the destination node.

In some examples, the first high-power node calculates a first transmission delay $ETD_{in}(i, j)$ from the low-power node i to the destination node j by using the following equation:

$$ETD_{in}(i, j) = (EDC_j - EDC_i) \cdot \left(\frac{T_s}{2} + T_{tx}\right)$$

$EDC_j$ is a preset awakening period of the destination node j, $EDC_i$ is a preset awakening period of the low-power node i, $T_s$ is a sleeping interval, $$\frac{T_s}{2}$$

is an expected waiting time for one awakening, and $T_{tx}$ is a total time of preset broadcasting times;

The first high-power node calculates a second transmission delay $ETDout(i, j)$ from the low-power node i to the destination node j by using the following equation:

$$ETD_{out}(i, j) = T_{tx} \cdot \frac{1}{P_{iX}} + T_{wait} + T_{re} \cdot \frac{1}{P_{Xj}} + \frac{T_s}{2}$$

wherein $P_{iX}$ is a packet receiving rate from the low-power node i to the high-power node X, $T_{wait}$ is the scheduled waiting time for the replay for the first high-power node, $T_{re}$ is a data packet replaying time for the first high-power node, $P_{Xj}$ is a packet receiving rate from the high-power node X to the destination node j. The high-power node X is another high-power node except the first high-power node existing between the low-power node i and the destination node j.

In order to determine a forwarding low-power node with the lowest delay, after obtaining the first transmission delay and the second transmission delay, the first high-power node may determine, based on the first transmission delay and the second transmission delay, a delay performance gain of the low-power node.

In some examples, the first high-power node may determine the delay performance gain Gain (i, j) of the low-power node i based on the first transmission delay $ETD_{in}(i,j)$ and the second transmission delay $ETD_{out}(i, j)$ through the equation:

Gain$(i,j)$=ETD$_{in}(i,j)$−ETD$_{out}(i,j)$

In yet other examples, when the delay performance gain of the low-power node is higher, it can be explained that the delay from the low-power node to the destination node when there is a high-power node is lower, and therefore, after determining the delay performance gains of all low-power nodes except the first low-power node, the first high-power node may select, from all low-power nodes except the first low-power node, a node with the largest delay performance gain as the forwarding low-power node. In this way, the determined forwarding low-power node can have the maximum delay performance gain, so that the determined forwarding low-power node has the minimum delay to the destination node, and thus the transmission delay of the data packet from the source node to the destination node in the low-power wireless network can be reduced.

It can be understood that steps S410, S420, and S460 in the embodiment of the present invention are the same as or similar to steps S110, S120, and S140 in the first implementation in an embodiment of the present invention, and will not be repeated here.

Figure 5:
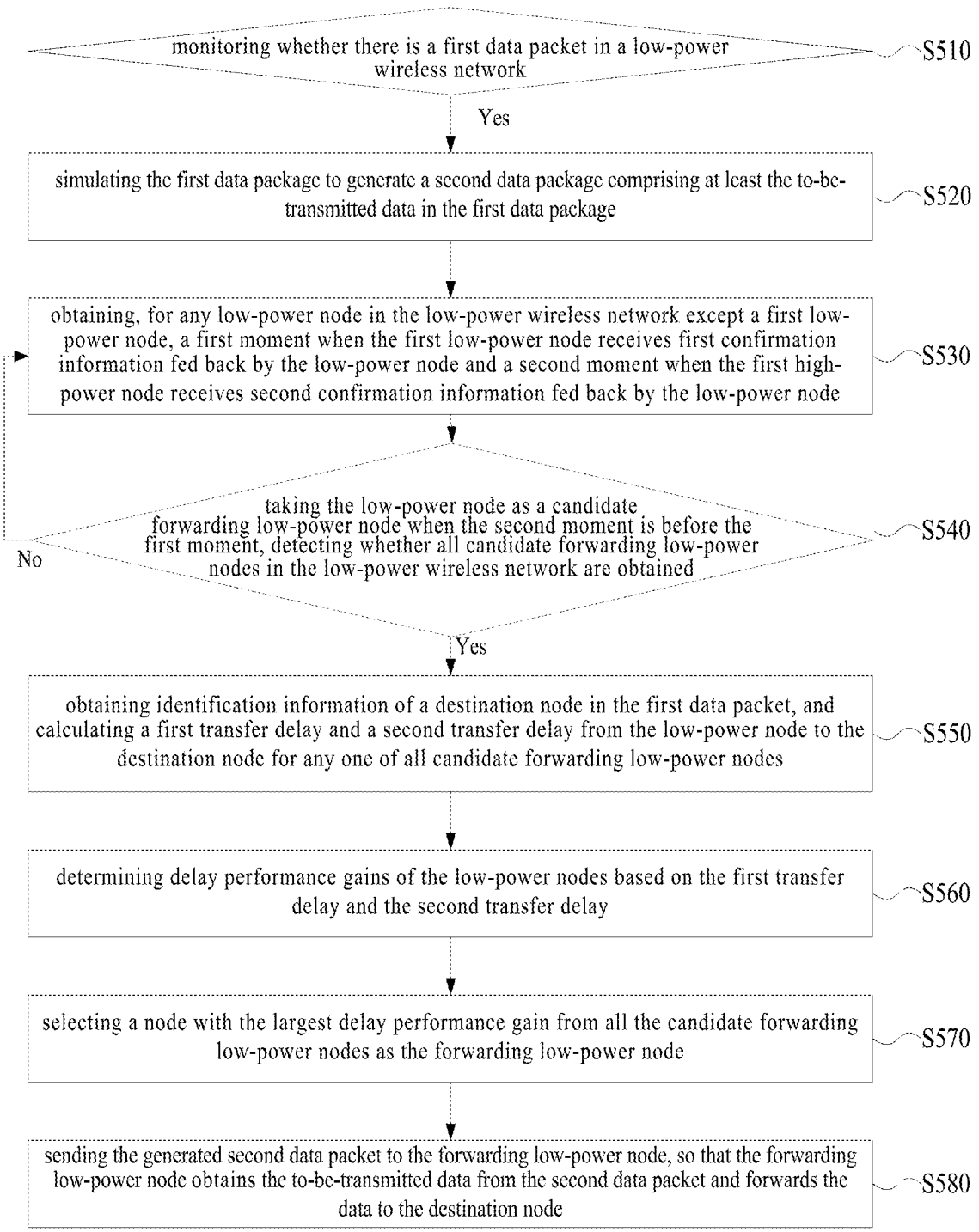
FIG. 5 is a flowchart of a fifth implementation of a method for cross-protocol opportunistic routing according to an embodiment of the present invention.

On the basis of the method for cross-protocol opportunistic routing shown in FIG. 4, an embodiment of the present invention further provides a possible implementation, as shown in FIG. 5, which is a flowchart of a fifth implementation of a method for cross-protocol opportunistic routing according to an embodiment of the present invention, and the method may include:

S510: monitoring whether there is a first data packet in a low-power wireless network, and if there is the first data packet in the low-power wireless network, perform step S520, wherein, the first data packet is sent by a first low-power node in the low-power wireless network based on an opportunistic routing protocol, and the first low-power node is a low-power wireless communication device located in a communication range of the first high-power node;

S520: simulating the first data packet to generate a second data packet including at least to-be-transmitted data in the first data packet;

S530, obtaining, for any low-power node in the low-power wireless network except the first low-power node, a first moment when the first low-power node receives first confirmation information fed back by the low-power node and a second moment when the first high-power node receives second confirmation information fed back by the low-power node, the first confirmation information and the second confirmation information are fed back at the same time by the low-power node for the same historical data packet received;

S540: taking the low-power node as a candidate forwarding low-power node when the second moment is before the first moment, detecting whether all candidate forwarding low-power nodes in the low-power wireless network are obtained, if not all candidate forwarding low-power nodes in the low-power wireless network are obtained, repeatedly executing step S530, and if all candidate forwarding low-power nodes in the low-power wireless network are obtained, executing step S550; and S550: obtaining identification information of a destination node in the first data packet, and calculating, for any one of all candidate forwarding low-power nodes, a first transmission delay and a second transmission delay from the low-power node to the destination node, wherein the first transmission delay is a delay when nodes between the low-power node and the destination node are all low-power nodes, and the second transmission delay is a delay when there is at least one other high-power node except the first high-power node between the low-power node and the destination node;

S560: determining delay performance gains of the low-power nodes based on the first transmission delay and the second transmission delay;

S570: selecting a node with the largest delay performance gain from all candidate forwarding low-power nodes as a forwarding low-power node; and S580: sending the generated second data packet to the forwarding low-power node, so that the forwarding low-power node obtains the to-be-transmitted data from the second data packet and forwards the data to the destination node.

In some examples, when the first high-power node does not receive the data packet from the first low-power node for the first time, in order to reduce the time for determining the forwarding low-power node, the first high-power node may obtain, for any low-power node in the low-power wireless network except the first low-power node, a first moment when the first low-power node receives the first confirmation information fed back by the low-power node, and a second moment when the first high-power node receives the second confirmation information fed back by the low-power node.

It can be understood that after the first low-power node sends the history packet to the destination node, the destination node may reply with confirmation information to the first low-power node, and the confirmation information may be eventually received by the first low-power node through the forwarding of each low-power nodes and/or high-power node in the low-power wireless network.

Therefore, after a low-power node forwards confirmation information to a first low-power node and a first high-power node, respectively, if a moment when the first high-power node receives the confirmation information is before a moment when the first low-power node receives the confirmation information, it can indicate that the delay from the low-power node to the first high-power node is relatively small, and therefore, the low-power node is a candidate node for increasing performance gain, and the candidate node can not only reduce the delay caused by wake-up waiting, but also reduce forwarding times.

In yet other examples, when the first high-power node and the first low-power node receive the confirmation information fed back by the destination node for each historical data packet, the moments when the confirmation information are received, that is, the first moment and the second moment, are both recorded, so that the first high-power node may obtain the first moment and the second moment, and then determine the candidate forwarding low-power node by comparing the first moment with the second moment.

After the first high-power node determines a candidate forwarding low-power node, in order to determine all candidate forwarding low-power nodes from the low-power wireless network except the first low-power node, the first high-power node may detect whether all candidate forwarding low-power nodes in the low-power wireless network are obtained.

In some examples, the first high-power node may first rank all low-power nodes in the low-power wireless network except the first low-power node, and then sequentially determine, according to the order of the ranked low-power nodes, whether each ranked low-power node is a candidate forwarding low-power node. After determining whether a low-power node is a candidate forwarding low-power node, the first high-power node may determine whether all candidate forwarding low-power nodes in the low-power wireless network are obtained by determining whether the low-power node is a last low-power node.

In yet other examples, the first high-power node may obtain the number of all low-power nodes in the low-power wireless network except the first low-power node, then sequentially select one low-power node from the low-power wireless network except the first low-power node, and after determining whether the low-power node is a candidate forwarding low-power node, label the low-power node. Based on this, when detecting whether all candidate forwarding low-power nodes in the low-power wireless network are obtained, the first high-power node may detect whether the low-power node selected from the low-power wireless network except the first low-power node has a label, and if the low-power node selected from the low-power wireless network except the first low-power node doesn't have a label, perform step S530. If there is a label, it is determined whether all candidate forwarding low-power nodes in the low-power wireless network are obtained by checking whether the number of the labels is the same as the number of all low-power nodes. If the number of the labels is the same as the number of all low-power nodes, it indicates completion of selecting candidate forwarding low-power nodes from the low-power wireless network except the first low-power node, so that it can be determined that all candidate forwarding low-power nodes in the low-power wireless network are obtained.

After all candidate forwarding low-power nodes are obtained, and when the first high-power node monitors whether there is a first data packet in the low-power wireless network, the first high-power node may obtain identification information of a destination node in the first data packet; for any one of all candidate forwarding low-power nodes, calculate a first transmission delay and a second transmission delay from the low-power node to the destination node; and then determine a delay performance gain of the low-power node based on the first transmission delay and the second transmission delay; and finally select a node with the largest delay performance gain as the forwarding low-power node from all candidate forwarding low-power nodes.

It can be understood that the steps S530 and S540 may be executed simultaneously with the step S520, or before the step S520, which is all possible.

In the embodiment of the present invention, candidate forwarding low-power nodes are determined first, and then a node with the largest delay performance gain is selected as the forwarding low-power node from all candidate forwarding low-power nodes. It can avoid determining the forwarding low-power node in the low-power wireless network except the first low-power node, thereby reducing the time overhead of determining the forwarding low-power node and further reducing the transmission delay of the data packet from the source node to the destination node in the low-power wireless network.

It can be understood that steps S510, S520, S560, and S580 in the embodiment of the present invention are the same as or similar to steps S410, S420, S440, and S460 in the first implementation in an embodiment of the present invention, and will not be repeated here.

Figure 6:
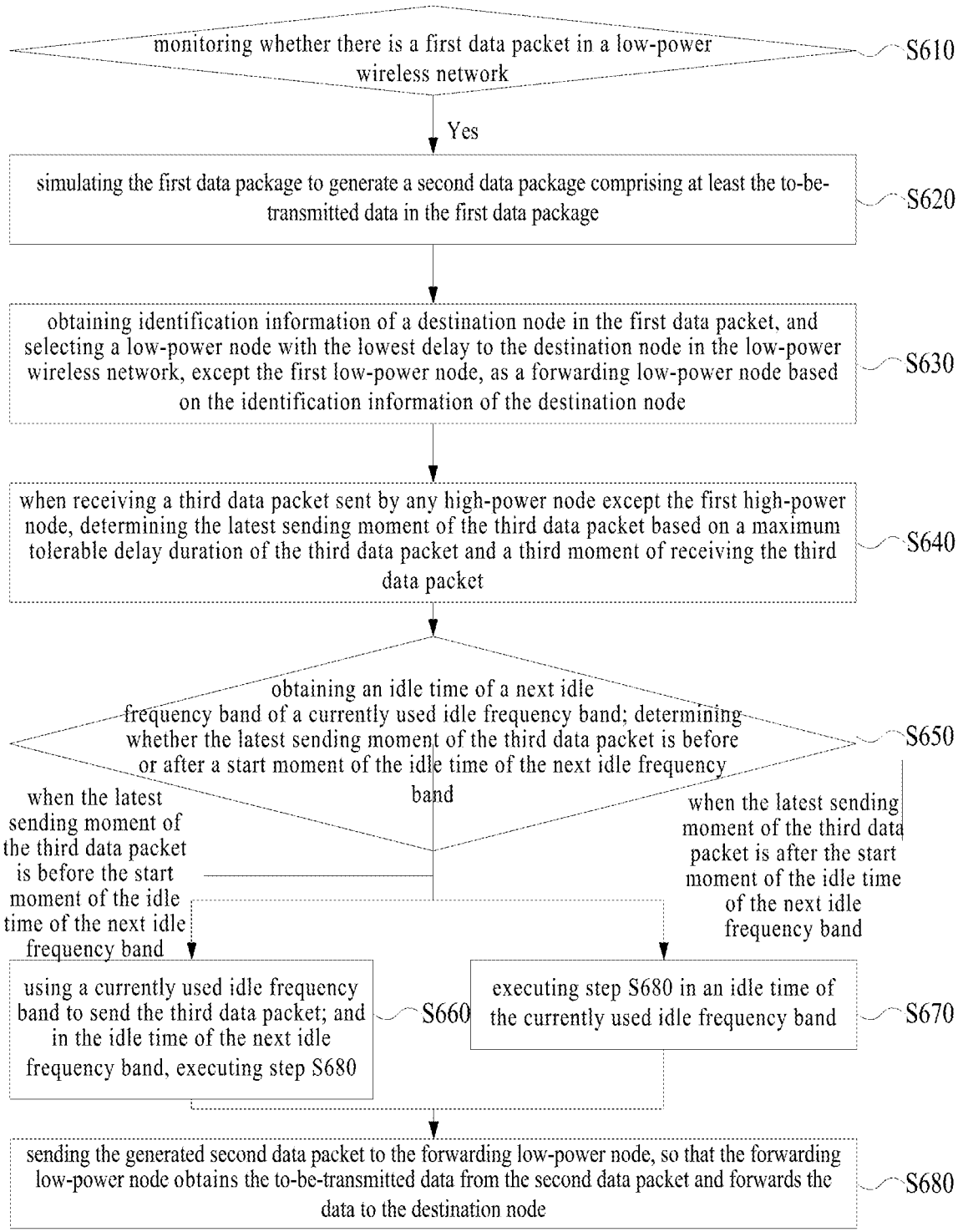
FIG. 6 is a flowchart of a sixth implementation of a method for cross-protocol opportunistic routing according to an embodiment of the present invention.

On the basis of the method for cross-protocol opportunistic routing shown in FIG. 1, an embodiment of the present invention further provides a possible implementation, as shown in FIG. 6, which is a flowchart of a sixth implementation of a method for cross-protocol opportunistic routing according to an embodiment of the present invention, and the method may include:

S610: monitoring whether there is a first data packet in a low-power wireless network, if there is the first data packet in the low-power wireless network, perform step S620;

wherein, the first data packet is sent by a first low-power node in the low-power wireless network based on an opportunistic routing protocol, and the first low-power node is a low-power wireless communication device located in a communication range of a first high-power node;

S620: simulating the first data packet to generate a second data packet including at least to-be-transmitted data in the first data packet;

S630: obtaining identification information of a destination node in the first data packet, and selecting a low-power node with the lowest delay to the destination node in the low-power wireless network, except the first low-power node, as a forwarding low-power node based on the identification information of the destination node;

S640: when receiving a third data packet sent by any high-power node except the first high-power node, determining the latest sending moment of the third data packet based on a maximum tolerable delay duration of the third data packet and a third moment of receiving the third data packet; the third data packet and the first data packet are different types of data packets;

S650: obtaining an idle time of a next idle frequency band of a currently used idle frequency band; determining whether the latest sending moment of the third data packet is before or after a start moment of the idle time of the next idle frequency band;

when the latest sending moment of the third data packet is before the start moment of the idle time of the next idle frequency band, executing step S660; and when the latest sending moment of the third data packet is after the start moment of the idle time of the next idle frequency band, executing step S670;

S660: using a currently used idle frequency band to send the third data packet; and in the idle time of the next idle frequency band, executing step S680;

S670: executing step S680 in an idle time of the currently used idle frequency band; and S680: sending the generated second data packet to the forwarding low-power node, so that the forwarding low-power node obtains the to-be-transmitted data from the second data packet and forwards the data to the destination node.

In some examples, after receiving the first data packet, the first high-power node may also receive a data packet sent by another high-power node, that is, a third data packet. At this time, in order to reduce an influence on sending the third data packet caused by sending the second data packet generated based on the first data packet, an embodiment of the present invention further provides a possible implementation.

After receiving the third data packet sent by another high-power node, the first high-power node may first obtain the maximum tolerable delay duration of the third data packet and the third moment of receiving the third data packet. The maximum tolerable delay duration is the maximum duration from the time when the node receives the data packet to the time when the node sends the data packet.

After the maximum tolerable delay duration and the third moment are obtained, the latest sending moment for sending the third data packet may be determined based on the maximum tolerable delay duration and the third moment.

In some examples, the first high-power node may send the data packet using an idle frequency band, and thus, the first high-power node may obtain the currently used idle frequency band.

In yet other examples, the idle frequency band generally has idle time. Therefore, the first high-power node may first determine the currently used idle frequency band, and then determine a next idle frequency band of the idle frequency band, and further obtain the idle time of the next idle frequency band of the idle frequency band.

And then, it is determined whether the latest sending moment of the third data packet is before the start moment of the idle time of the next idle frequency band of the currently used idle frequency band or after the start moment of the idle time of the next idle frequency band of the currently used idle frequency band.

When the latest sending moment of the third data packet is before the start moment of the idle time of the next idle frequency band of the currently used idle frequency band, it means that the third data packet cannot wait until the idle time of the next idle frequency band of the currently used idle frequency band before being sent. For this, the first high-power node may send the third data packet using the currently used idle frequency band, and then send the generated second data packet to the forwarding low-power node at the idle time of the next idle frequency band of the currently used idle frequency band, so that the forwarding low-power node obtains the to-be-transmitted data from the second data packet and forwards the data to the destination node.

When the latest sending moment of the third data packet is after the start moment of the idle time of the next idle frequency band of the currently used idle frequency band, it means that the third data packet can wait until the idle time of the next idle frequency band of the currently used idle frequency band before being sent. For this, the first high-power node may send the generated second data packet to the forwarding low-power node within the idle time of the currently used idle frequency band, so that the forwarding low-power node obtains the to-be-transmitted data from the second data packet and forwards the data to the destination node. In the idle time of the next idle frequency band of the currently used idle frequency band, the third data packet is sent.

In yet other examples, the first high-power node may obtain the duration of each idle time and the duration required for sending each second data packet, and then determine the number of data packets that can be sent in each idle time, and send the data packets according to the calculated number of data packets that can be sent in each idle time.

Through the embodiment of the present invention, after the first high-power node receives the data packet sent by the high-power node and the data packet sent by the low-power node, the data packet sent by the high-power node and the data packet sent by the low-power node may be scheduled and sent, so that the influence on that the first high-power node sending the data packet sent by the high-power node caused by the first high-power node sending the data packet sent by the low-power node can be reduced.

It can be understood that steps S610 to S630 and S680 in the embodiment of the present invention are the same as or similar to steps S120 to S140 in the first implementation in an embodiment of the present invention, and will not be repeated here.

Figure 7:
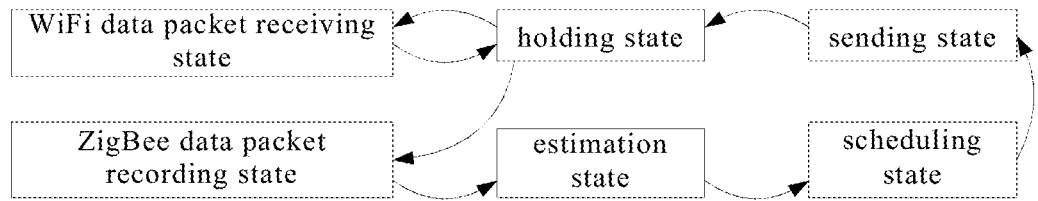
FIG. 7 is a state transition diagram of a first high-power node in the method for cross-protocol opportunistic routing according to an embodiment of the present invention.

In some examples, in order to more clearly illustrate states of a first high-power node when executing different steps in the embodiments of the present invention, the description will be made here with reference to a state transition diagram shown in FIG. 7. As shown in FIG. 7, it is a state transition diagram of the first high-power node in the methods for cross-protocol opportunistic routing according to the embodiments of the present invention, it is assumed that the first high-power node is a WiFi device, and the low-power node is a ZigBee device.

In the initial state, the WiFi device is in a holding state, and after receiving a WiFi data packet sent by another WiFi device, the WiFi device enters a WiFi data packet receiving state. After receiving the WiFi data packet, the WiFi device returns to the holding state, if the WiFi device monitors the ZigBee data packet sent by the ZigBee device, the WiFi device enters a ZigBee data packet recording state to receive and store the ZigBee data packet, and then enters a estimation state, and uses the methods for cross-protocol opportunistic routing according to the embodiments of the present invention to determine the forwarding low-power node. After the forwarding low-power node is determined, the WiFi device enters a scheduling state, and determines the sending moment of the WiFi data packet and the sending moment of the ZigBee data packet according to steps S640 to S680 in the sixth implementation of the method for cross-protocol opportunistic routing according to an embodiment of the present invention, and then the WiFi device enters a sending state, and schedule the sending of the WiFi data packet and the ZigBee data packet according to the determined sending moment of the WiFi data packet and the determined sending moment of the ZigBee data packet. After the WiFi data packet and the ZigBee data packet are sent, the WiFi device returns to the holding state, so as to continue to receive subsequent WiFi data packets and/or ZigBee data packets.

Figure 8:
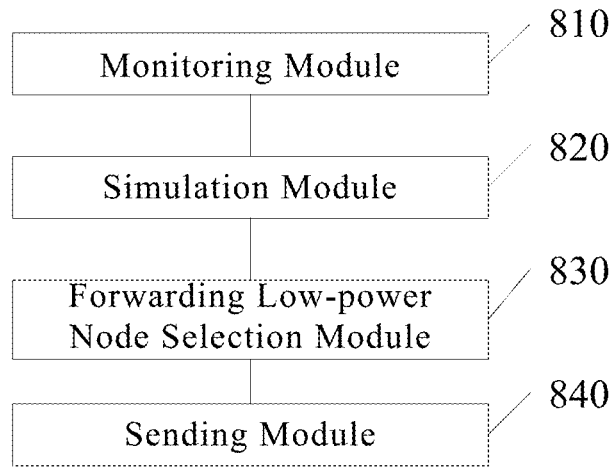
FIG. 8 is a schematic structural diagram of an apparatus for cross-protocol opportunistic routing according to an embodiment of the present invention.

Corresponding to the foregoing method embodiments, an embodiment of the present invention further provides an apparatus for cross-protocol opportunistic routing, as shown in FIG. 8, which is a schematic structural diagram of the apparatus for cross-protocol opportunistic routing according to the embodiment of the present invention, the apparatus may be applied to at least one high-power node in a high-power wireless network, each high-power node is a high-power wireless communication device, and an opportunistic routing protocol configured on the high-power node, and referring to FIG. 8, the apparatus may include:

a monitoring module 810, configured for monitoring whether there is a first data packet in a low-power wireless network, and if there is the first data packet in the low-power wireless network, triggering a simulation module, the first data packet is sent by a first low-power node in the low-power wireless network based on the opportunistic routing protocol, and the first low-power node is a low-power wireless communication device located in a communication range of a first high-power node;

a simulation module 820, configured for simulating the first data packet to generate a second data packet including at least to-be-transmitted data in the first data packet;

a forwarding low-power node selection module 830, configured for obtaining identification information of a destination node in the first data packet, and selecting a low-power node with the lowest delay to the destination node in the low-power wireless network, except the first low-power node, as a forwarding low-power node based on the identification information of the destination node; and a sending module 840, configured for sending the generated second data packet to the forwarding low-power node, so that the forwarding low-power node obtains the to-be-transmitted data from the second data packet and forwards the data to the destination node.

The method, apparatus for cross-protocol opportunistic routing, electronic device and storage medium according to the embodiments of the invention may be applied to a first high-power node in a high-power wireless network. The first high-power node is any high-power wireless communication device in the high-power wireless network, and the first high-power node having an opportunistic routing protocol configured thereon. The first high-power node may firstly monitor whether there is a first data packet in a low-power wireless network, the first data packet is sent by a first low-power node in the low-power wireless network based on the opportunistic routing protocol and the first low-power node is a low-power wireless communication device located in a communication range of the first high-power node. If there is the first data packet in the low-power wireless network, the first high-power node simulates the first data packet to generate a second data packet including at least the to-be-transmitted data in the first data packet; obtains identification information of a destination node in the first data packet, and selects a low-power node with the lowest delay to the destination node in the low-power wireless network, except the first low-power node, as a forwarding low-power node based on the identification information of the destination node; and sends the generated second data packet to the forwarding low-power node, so that the forwarding low-power node obtains the to-be-transmitted data from the second data packet and forwards the data to the destination node. Since the high-power node is used in the embodiment of the invention, when there is a data packet in the low-power node, the data packet can be sent in time without transmitting the data packet on a reserved channel, and the high-power node receives the data packet based on the opportunistic routing protocol and forwards the data packet to the forwarding low-power node, and then the forwarding low-power node sends the data packet to the destination node, thereby reducing the transmission delay of the data packet from the source node to the destination node in the low-power wireless network. Further, since high-power nodes generally have a larger communication range than low-power nodes, compared to transmitting the data packet through the low-power wireless network, transmitting the data packet through a high-power node can reduce the hops of nodes that the data packet passes from the source node to the destination node, and therefore, the transmission delay can be further reduced.

In some examples, the monitoring module 810 is specifically configured for:

when monitoring any to-be-detected data packet, obtaining a start delimiter of the to-be-detected data packet; performing a convolution operation on the start delimiter of the to-be-detected data packet and a pre-stored standard start delimiter of a protocol used by the low-power wireless network to obtain a first correlation between the start delimiter of the to-be-detected data packet and the standard start delimiter; and determining the to-be-detected data packet as a first data packet in the low-power wireless network when the first correlation is greater than or equal to a first preset correlation threshold.

In some examples, the monitoring module 810 is specifically configured for:

when monitoring any to-be-detected data packet, calculating a phase deviation of the to-be-detected data packet; performing a convolution operation on the phase deviation of the to-be-detected data packet and a phase deviation of a pre-stored standard start delimiter of a protocol used by the low-power wireless network to obtain a second correlation between the phase deviation of the to-be-detected data packet and the phase deviation of the standard start delimiter; and determining the to-be-detected data packet as a first data packet in the low-power wireless network when the second correlation is greater than or equal to a second preset correlation threshold.

The forwarding low-power node selection module 830 includes:

a delay calculation submodule, configured for obtaining identification information of the destination node in the first data packet, and calculating, for any low-power node in the low-power wireless network except the first low-power node, a first transmission delay and a second transmission delay from the low-power node to the destination node, the first transmission delay is a delay when nodes between the low-power node and the destination node are all low-power nodes, and the second delay is a delay when there is at least one other high-power node except the first high-power node between the low-power node and the destination node;

a delay performance gain determining submodule, configured for determining delay performance gains of the low-power nodes based on the first transmission delay and the second transmission delay; and a forwarding low-power node selection submodule, configured for selecting a node with the largest delay performance gain in the low-power nodes except the first low-power node as the forwarding low-power node.

In some examples, the forwarding low-power node selection module 830 further includes:

a confirmation information obtaining submodule, configured for obtaining, for any low-power node in the low-power wireless network except the first low-power node, a first moment when the first low-power node receives first confirmation information fed back by the low-power node and a second moment when the first high-power node receives second confirmation information fed back by the low-power node, the first confirmation information and the second confirmation information are fed back at the same time by the low-power node for the same historical data packet received;

a candidate forwarding low-power node determining submodule, configured for taking the low-power node as a candidate forwarding low-power node when the second moment is before the first moment, and triggering the confirmation information obtaining submodule to execute the step of obtaining, for any low-power node in the low-power wireless network except the first low-power node, the first moment when the first low-power node receives the first confirmation information fed back by the low-power node and the second moment when the first high-power node receives the second confirmation information fed back by the low-power node, so as to obtain all candidate forwarding low-power nodes in the low-power wireless network;

a delay calculation submodule is specifically configured for:

obtaining the identification information of the destination node in the first data packet, and calculating, for any low-power node of all candidate forwarding low-power nodes, the first transmission delay and the second transmission delay from the low-power node to the destination node;

the forwarding low-power node selection submodule is specifically configured for:

selecting a node with the largest delay performance gain from all candidate forwarding low-power nodes as the forwarding low-power node.

In some examples, the apparatus further includes:

a latest sending moment determining module, configured for determining a latest sending moment of a third data packet based on a maximum tolerable delay duration of the third data packet and a third moment of receiving the third data packet when the third data packet sent by any high-power node except the first high-power node is received; the third data packet and the first data packet are different types of data packets;

an idle time obtaining module, configured for obtaining an idle time of a next idle frequency band of a currently used idle frequency band;

the sending module 840 is specifically configured for:

when the latest sending moment of the third data packet is before the start moment of the idle time of the next idle frequency band, using a currently used idle frequency band to send the third data packet; and in the idle time of the next idle frequency band, executing the step of sending the generated second data packet to the forwarding low-power node, so that the forwarding low-power node obtains the to-be-transmitted data from the second data packet and forwards the data to the destination node;

when the latest sending moment of the third data packet is after the start moment of the idle time of the next idle frequency band, in the idle time of the currently used idle frequency band, executing the step of sending the generated second data packet to the forwarding low-power node, so that the forwarding low-power node obtains the to-be-transmitted data from the second data packet and forwards the data to the destination node.

In some examples, the apparatus further includes:

a communication range determining module, configured for determining whether the destination node of the first data packet is in the communication range of the first high-power node based on the identification information of the destination node; if the destination node of the first data packet is in the communication range of the first high-power node, triggering the sending module 840 to execute the step of sending the second data packet to the destination node; otherwise, triggering the sending module 840 to execute the step of selecting the low-power node with the lowest delay to the destination node in the low-power wireless network, except the first low-power node, as the forwarding low-power node based on the identification information of the destination node.

Figure 9:
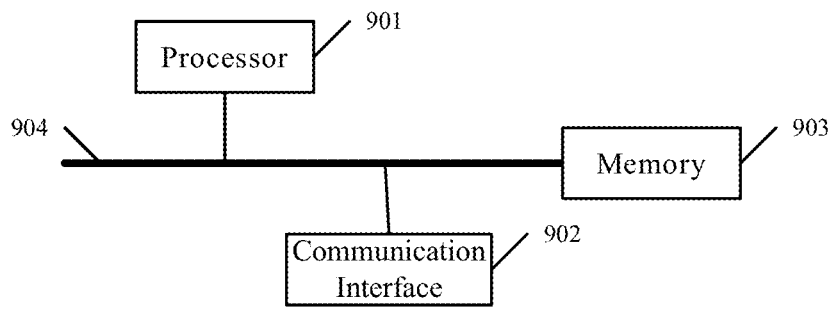
FIG. 9 is a schematic structural diagram of an electronic device according to an embodiment of the present invention.

An embodiment of the present invention further provides an electronic device, as shown in FIG. 9, including a processor 901, a communication interface 902, a memory 903, and a communication bus 904; the processor 901, the communication interface 902, and the memory 903 communicate with each other through the communication bus 904, the memory 903 is configured for storing computer programs;

the processor 901 is configured for implementing the steps of the method for cross-protocol opportunistic routing shown in any of the above embodiments when executing the programs stored on the memory 903, for example, the following steps may be implemented:

monitoring whether there is a first data packet in a low-power wireless network, the first data packet is sent by a first low-power node in the low-power wireless network based on an opportunistic routing protocol, and the first low-power node is a low-power wireless communication device located in a communication range of the first high-power node;

if there is the first data packet in the low-power wireless network, simulating the first data packet to generate a second data packet including at least to-be-transmitted data in the first data packet;

obtaining identification information of a destination node in the first data packet, and selecting a low-power node with the lowest delay to the destination node in the low-power wireless network, except the first low-power node, as a forwarding low-power node based on the identification information of the destination node; and sending the generated second data packet to the forwarding low-power node, so that the forwarding low-power node obtains the to-be-transmitted data from the second data packet and forwards the data to the destination node.

The communication bus mentioned in the electronic device may be a Peripheral Component Interconnect (PCI) bus, an Extended Industry Standard Architecture (EISA) bus, or the like. The communication bus may be divided into address bus, data bus, control bus, etc. For ease of illustration, only one thick line is shown, but this is not intended to represent only one bus or one type of bus.

The communication interface is used for communication between the electronic device and other devices.

The memory may include Random Access Memory (RAM) or Non-Volatile Memory (NVM), such as at least one disk memory. Alternatively, the memory may also be at least one storage device located away from the processor.

The processor may be a general-purpose processor, including Central Processing Unit (CPU), Network Processor (NP), and the like; may also be a Digital Signal Processor (DSP), Application Specific Integrated Circuit (ASIC), Field Programmable Gate Array (FPGA) or other programmable logic device, discrete gate or transistor logic device, discrete hardware component.

In another embodiment according to the present invention, a computer-readable storage medium is further provided, stored thereon a computer programs that, upon executed by a processor, implement the steps of the method for cross-protocol opportunistic routing shown in any one of the foregoing embodiments, for example, the following steps may be implemented:

monitoring whether there is a first data packet in a low-power wireless network, the first data packet is sent by a first low-power node in the low-power wireless network based on an opportunistic routing protocol, and the first low-power node is a low-power wireless communication device located in a communication range of the first high-power node;

if there is the first data packet in the low-power wireless network, simulating the first data packet to generate a second data packet including at least to-be-transmitted data in the first data packet;

obtaining identification information of a destination node in the first data packet, and selecting a low-power node with the lowest delay to the destination node in the low-power wireless network, except the first low-power node, as a forwarding low-power based on the identification information of the destination node; and sending the generated second data packet to the forwarding low-power node, so that the forwarding low-power node obtains the to-be-transmitted data from the second data packet and forwards the data to the destination node.

In yet another embodiment according to the present invention, there is also provided a computer program product containing instructions that, upon running on a computer, cause the computer to perform the steps of the method for cross-protocol opportunistic routing shown in any one of the embodiments, for example, the following steps may be performed:

monitoring whether there is a first data packet in a low-power wireless network, the first data packet is sent by a first low-power node in the low-power wireless network based on an opportunistic routing protocol, and the first low-power node is a low-power wireless communication device located in a communication range of the first high-power node;

if there is the first data packet in the low-power wireless network, simulating the first data packet to generate a second data packet including at least to-be-transmitted data in the first data packet;

obtaining identification information of a destination node in the first data packet, and selecting a low-power node with the lowest delay to the destination node in the low-power wireless network, except the first low-power node, as a forwarding low-power node based on the identification information of the destination node; and sending the generated second data packet to the forwarding low-power node, so that the forwarding low-power node obtains the to-be-transmitted data from the second data packet and forwards the data to the destination node.

In the above embodiments, it may be implemented in whole or in part by software, hardware, firmware, or any combination thereof. When implemented in software, it may be implemented in the form of a computer program product in whole or in part. The computer program product includes one or more computer instructions. The procedures or functions illustrated shown in the embodiments of the invention are generated in whole or in part when the computer program instructions are loaded and executed on the computer. The computer may be a general purpose computer, a special purpose computer, a network of computers, or other programmable device. The computer instructions may be stored in a computer readable storage medium or transmitted from one computer readable storage medium to another computer readable storage medium, for example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage media may be any available media that can be accessed by a computer or a data storage device, such as a server, data center, etc., that includes one or more available media. The usable medium may be a magnetic medium (e.g., floppy disk, hard disk, magnetic tape), an optical medium (e.g., DVD), or a semiconductor medium (e.g., Solid State Disk (SSD)), among others.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, electronic device and storage medium are described briefly, since it is substantially similar to the embodiment of the method, and the related contents can refer to the description of the embodiment of the method.

The embodiments described above are simply preferable embodiments of the present invention, and are not intended to limit the scope of protection of the present invention. Any modifications, alternatives, improvements, or the like within the spirit and principle of the present invention shall be included within the scope of protection of the present invention.

What is claimed is:

1. A method for cross-protocol opportunistic routing, which is applied to a first high-power node in a high-power wireless network, the first high-power node is any high-power wireless communication device in the high-power wireless network, and an opportunistic routing protocol is configured on the first high-power node, the method comprises:

monitoring whether there is a first data packet in a low-power wireless network, wherein the first data packet is sent by a first low-power node in the low-power wireless network based on the opportunistic routing protocol, and the first low-power node is a low-power wireless communication device located in a communication range of the first high-power node;

if there is a first data packet in the low-power wireless network, simulating the first data package to generate a second data package comprising at least to-be-transmitted data in the first data package;

obtaining identification information of a destination node in the first data packet, and selecting a low-power node with a lowest delay to the destination node in the low-power wireless network, except the first low-power node, as a forwarding low-power node based on the identification information of the destination node; and sending the generated second data packet to the forwarding low-power node, so that the forwarding low-power node obtains the to-be-transmitted data from the second data packet and forwards the data to the destination node.

2. The method of claim 1, wherein monitoring whether there is a first data packet in the low-power wireless network comprises:

when any to-be-detected data packet is monitored, obtaining a start delimiter of the to-be-detected data packet;

performing a convolution operation on the start delimiter of the to-be-detected data packet and a pre-stored standard start delimiter of a protocol used by the low-power wireless network to obtain a first correlation between the start delimiter of the to-be-detected data packet and the standard start delimiter; and determining the to-be-detected data packet as the first data packet in the low-power wireless network when the first correlation is greater than or equal to a first preset correlation threshold.

3. The method of claim 1, wherein monitoring whether there is a first data packet in the low-power wireless network comprises:

when any to-be-detected data packet is monitored, calculating a phase deviation of the to-be-detected data packet;

performing a convolution operation on the phase deviation of the to-be-detected data packet and a phase deviation of a pre-stored standard start delimiter of a protocol used by the low-power wireless network to obtain a second correlation between the phase deviation of the to-be-detected data packet and the phase deviation of the standard start delimiter; and determining the to-be-detected data packet as the first data packet in the low-power wireless network when the second correlation is greater than or equal to a second preset correlation threshold.

4. The method of claim 1, wherein obtaining the identification information of the destination node in the first data packet, and selecting the low-power node with a lowest delay to the destination node in the low-power wireless network, except the first low-power node, as the forwarding low-power node based on the identification information of the destination node comprises:

obtaining the identification information of the destination node in the first data packet, and calculating, for any low-power node in the low-power wireless network except the first low-power node, a first transmission delay and a second transmission delay from the low-power node to the destination node, wherein the first transmission delay is a delay when nodes between the low-power node and the destination node are all low-power nodes, and the second delay is a delay when there is at least one other high-power node except the first high-power node between the low-power node and the destination node;

determining delay performance gains of the low-power nodes based on the first transmission delay and the second transmission delay; and selecting a node with a largest delay performance gain in the low-power nodes except the first low-power node as the forwarding low-power node.

5. The method of claim 2, wherein obtaining the identification information of the destination node in the first data packet, and selecting the low-power node with a lowest delay to the destination node in the low-power wireless network, except the first low-power node, as the forwarding low-power node based on the identification information of the destination node comprises:

obtaining the identification information of the destination node in the first data packet, and calculating, for any low-power node in the low-power wireless network except the first low-power node, a first transmission delay and a second transmission delay from the low-power node to the destination node, wherein the first transmission delay is a delay when nodes between the low-power node and the destination node are all low-power nodes, and the second delay is a delay when there is at least one other high-power node except the first high-power node between the low-power node and the destination node;

determining delay performance gains of the low-power nodes based on the first transmission delay and the second transmission delay; and selecting a node with a largest delay performance gain in the low-power nodes except the first low-power node as the forwarding low-power node.

6. The method of claim 3, wherein obtaining the identification information of the destination node in the first data packet, and selecting the low-power node with a lowest delay to the destination node in the low-power wireless network, except the first low-power node, as the forwarding low-power node based on the identification information of the destination node comprises:

obtaining the identification information of the destination node in the first data packet, and calculating, for any low-power node in the low-power wireless network except the first low-power node, a first transmission delay and a second transmission delay from the low-power node to the destination node, wherein the first transmission delay is a delay when nodes between the low-power node and the destination node are all low-power nodes, and the second delay is a delay when there is at least one other high-power node except the first high-power node between the low-power node and the destination node;

determining delay performance gains of the low-power nodes based on the first transmission delay and the second transmission delay; and selecting a node with a largest delay performance gain in the low-power nodes except the first low-power node as the forwarding low-power node.

7. The method of claim 4, wherein before obtaining the identification information of the destination node in the first data packet, and calculating, for any low-power node in the low-power wireless network except the first low-power node, the first transmission delay and the second transmission delay from the low-power node to the destination node, the method further comprises:

obtaining, for any low-power node in the low-power wireless network except the first low-power node, a first moment when the first low-power node receives first confirmation information fed back by the low-power node and a second moment when the first high-power node receives second confirmation information fed back by the low-power node, wherein the first confirmation information and the second confirmation information are fed back at the same time by the low power node for the same historical data packet received;

taking the low-power node as a candidate forwarding low-power node when the second moment is before the first moment, and repeatedly executing the step of obtaining, for any low-power node in the low-power wireless network except the first low-power node, the first moment when the first low-power node receives the first confirmation information fed back by the low-power node and the second moment when the first high-power node receives the second confirmation information fed back by the low-power node, so as to obtain all candidate forwarding low-power nodes in the low-power wireless network;

obtaining the identification information of the destination node in the first data packet, and calculating, for any low-power node in the low-power wireless network except the first low-power node, the first transmission delay and the second transmission delay from the low-power node to the destination node, comprises:

obtaining the identification information of the destination node in the first data packet, and calculating, for any low-power node of all candidate forwarding low-power nodes, the first transmission delay and the second transmission delay from the low-power node to the destination node;

selecting the node with the largest delay performance gain from the low-power nodes except the first low-power node as the forwarding low-power node comprises:

selecting a node with the largest delay performance gain from all candidate forwarding low-power nodes as the forwarding low-power node.

8. The method of claim 1, wherein after selecting the low-power node with the lowest delay to the destination node in the low-power wireless network, except the first low-power node, as the forwarding low-power node based on the identification information of the destination node, the method further comprises:

when a third data packet sent by any high-power node except the first high-power node is received, determining a latest sending moment of the third data packet based on a maximum tolerant delay duration of the third data packet and a third moment of receiving the third data packet; wherein the third data packet and the first data packet are different types of data packets;

obtaining an idle time of a next idle frequency band of a currently used idle frequency band;

when the latest sending moment of the third data packet is before a start moment of the idle time of the next idle frequency band, using the currently used idle frequency band to send the third data packet; and in the idle time of the next idle frequency band, executing the step of sending the generated second data packet to the forwarding low-power node, so that the forwarding low-power node obtains the to-be-transmitted data from the second data packet and forwards the data to the destination node; and when the latest sending moment of the third data packet is after the start moment of the idle time of the next idle frequency band, in the idle time of the currently used idle frequency band, executing the step of sending the generated second data packet to the forwarding low-power node, so that the forwarding low-power node obtains the to-be-transmitted data from the second data packet and forwards the data to the destination node.

9. The method of claim 2, wherein after selecting the low-power node with the lowest delay to the destination node in the low-power wireless network, except the first low-power node, as the forwarding low-power node based on the identification information of the destination node, the method further comprises:

when a third data packet sent by any high-power node except the first high-power node is received, determining a latest sending moment of the third data packet based on a maximum tolerant delay duration of the third data packet and a third moment of receiving the third data packet; wherein the third data packet and the first data packet are different types of data packets;

obtaining an idle time of a next idle frequency band of a currently used idle frequency band;

when the latest sending moment of the third data packet is before a start moment of the idle time of the next idle frequency band, using the currently used idle frequency band to send the third data packet; and in the idle time of the next idle frequency band, executing the step of sending the generated second data packet to the forwarding low-power node, so that the forwarding low-power node obtains the to-be-transmitted data from the second data packet and forwards the data to the destination node; and when the latest sending moment of the third data packet is after the start moment of the idle time of the next idle frequency band, in the idle time of the currently used idle frequency band, executing the step of sending the generated second data packet to the forwarding low-power node, so that the forwarding low-power node obtains the to-be-transmitted data from the second data packet and forwards the data to the destination node.

10. The method of claim 3, wherein after selecting the low-power node with the lowest delay to the destination node in the low-power wireless network, except the first low-power node, as the forwarding low-power node based on the identification information of the destination node, the method further comprises:
- when a third data packet sent by any high-power node except the first high-power node is received, determining a latest sending moment of the third data packet based on a maximum tolerant delay duration of the third data packet and a third moment of receiving the third data packet; wherein the third data packet and the first data packet are different types of data packets;
- obtaining an idle time of a next idle frequency band of a currently used idle frequency band;
- when the latest sending moment of the third data packet is before a start moment of the idle time of the next idle frequency band, using the currently used idle frequency band to send the third data packet; and in the idle time of the next idle frequency band, executing the step of sending the generated second data packet to the forwarding low-power node, so that the forwarding low-power node obtains the to-be-transmitted data from the second data packet and forwards the data to the destination node; and
- when the latest sending moment of the third data packet is after the start moment of the idle time of the next idle frequency band, in the idle time of the currently used idle frequency band, executing the step of sending the generated second data packet to the forwarding low-power node, so that the forwarding low-power node obtains the to-be-transmitted data from the second data packet and forwards the data to the destination node.

11. The method of claim 1, wherein after obtaining the identification information of the destination node in the first data packet, the method further comprises:
- determining whether the destination node of the first data packet is in the communication range of the first high-power node based on the identification information of the destination node;
- if the destination node of the first data packet is in the communication range of the first high-power node, sending the second data packet to the destination node; and
- if the destination node of the first data packet is not in the communication range of the first high-power node, executing the step of selecting the low-power node with the lowest delay to the destination node in the low-power wireless network, except the first low-power node, as the forwarding low-power node based on the identification information of the destination node.

12. An apparatus for cross-protocol opportunistic routing, which is applied to at least one high-power node in a high-power wireless network, wherein each high-power node is a high-power wireless communication device, and an opportunistic routing protocol is configured on the high-power node, and the apparatus comprises:
- a monitoring module, configured for monitoring whether there is a first data packet in a low-power wireless network, and if there is a first data packet in the low-power wireless network, triggering a simulation module, wherein the first data packet is sent by a first low-power node in the low-power wireless network based on the opportunistic routing protocol, and the first low-power node is a low-power wireless communication device located in a communication range of the first high-power node;
- a simulation module, configured for simulating the first data packet to generate a second data packet comprising at least to-be-transmitted data in the first data packet;
- a forwarding low-power node selection module, configured for obtaining identification information of a destination node in the first data packet, and selecting a low-power node with a lowest delay to the destination node in the low-power wireless network, except the first low-power node, as a forwarding low-power node based on the identification information of the destination node; and
- a sending module, configured for sending the generated second data packet to the forwarding low-power node, so that the forwarding low-power node obtains the to-be-transmitted data from the second data packet and forwards the data to the destination node.

13. An electronic device, comprising a processor, a communication interface, a memory, and a communication bus, wherein the processor, the communication interface, and the memory communicate with each other through the communication bus;
- the memory is configured for storing computer programs; and
- the processor is configured for implementing the steps of the method of claim 1 when executing the programs stored in the memory.

14. A non-transitory storage medium, stored thereon computer programs that, upon executed by a processor, implement the steps of the method of claim 1.

* * * * *